(12) United States Patent
Kumakura et al.

(10) Patent No.: US 7,618,245 B2
(45) Date of Patent: Nov. 17, 2009

(54) FLUID MACHINE

(75) Inventors: Eiji Kumakura, Osaka (JP); Masakazu Okamoto, Osaka (JP); Tetsuya Okamoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 212 days.

(21) Appl. No.: 11/664,293

(22) PCT Filed: Sep. 30, 2005

(86) PCT No.: PCT/JP2005/018140

§ 371 (c)(1),
(2), (4) Date: Mar. 29, 2007

(87) PCT Pub. No.: WO2006/035934

PCT Pub. Date: Apr. 6, 2006

(65) Prior Publication Data

US 2008/0085206 A1 Apr. 10, 2008

(30) Foreign Application Priority Data

Sep. 30, 2004 (JP) .............................. 2004-286864

(51) Int. Cl.
*F01C 21/00* (2006.01)
*F03C 2/00* (2006.01)
*F04C 18/00* (2006.01)

(52) U.S. Cl. .............................. 418/3; 418/5; 418/104; 418/182; 417/244; 417/247; 417/310

(58) Field of Classification Search ...................... 418/3, 418/5, 15, 58, 59, 60, 65, 102, 104, 182; 417/244, 247, 310, 366, 410.3
See application file for complete search history.

(56) References Cited

U.S. PATENT DOCUMENTS

| 5,160,178 A | * | 11/1992 | Iwabuchi ..................... 285/328 |
| 6,056,523 A | | 5/2000 | Won et al. |
| 6,425,749 B1 | | 7/2002 | Lettner et al. |
| 7,419,369 B2 | * | 9/2008 | Sakitani et al. ................ 418/3 |

FOREIGN PATENT DOCUMENTS

| JP | 48-27111 A | 4/1973 |
| JP | 61-182420 U | 11/1986 |
| JP | 9-126171 A | 5/1997 |
| JP | 2002-540368 A | 11/2002 |
| JP | 2003-139059 A | 5/2003 |
| JP | 2003-172244 A | 6/2003 |
| JP | 2004-257303 A | 9/2004 |
| KR | 0173582 B1 | 10/1998 |

* cited by examiner

*Primary Examiner*—Theresa Trieu
(74) *Attorney, Agent, or Firm*—Birch, Stewart, Kolasch and Birch, LLP

(57) ABSTRACT

Oil supply grooves (74, 84) are formed respectively in a rotating shaft (70) of a compression mechanism (50) integral with an electric motor (40) and in a rotating shaft (80) of an expansion mechanism (60). The rotating shafts (70, 80) are coupled together by engagement between an engagement convex portion (85) and an engagement concave portion (75) which are formed respectively in shaft ends of the rotating shafts (70, 80). And, a seal groove (S) is formed in the peripheral surface of the engagement convex portion (85) and an O-ring (R) is engaged into the seal groove (S). Hereby, lubrication oil leakage from between the engagement convex portion (85) and the engagement concave portion (75) is prevented.

7 Claims, 10 Drawing Sheets

FLUID MACHINE

TECHNICAL FIELD

The present invention relates to fluid machinery. More particularly, this invention concerns a fluid machine having a compressor and an expander which are mechanically coupled together.

BACKGROUND ART

A fluid machine is known in the conventional technology which includes a single casing containing therein a compressor and an expander (see, for example, JP-A-2003-172244). The fluid machine disclosed in JP-A-2003-172244 is used in a refrigerant circuit of an air conditioner.

The refrigerant circuit of the air conditioner is made up of a compressor, a cooler, an expander, and an evaporator which are connected by piping. In the refrigerant circuit, refrigerant is circuited whereby a vapor compression refrigeration cycle is performed. That is to say, refrigerant compressed in the compressor is cooled in the cooler, expanded in the expander, evaporated in the evaporator, and returned again back to the compressor. And, the compressor and the expander are coupled together through the driving shaft of an electric motor. Stated another way, the compressor and the expander are connected together by a single rotating shaft.

In the fluid machine, power is generated by the expansion of refrigerant in the expander and the generated power is transmitted, as rotational power, through the driving shaft to the compressor. By means of this, the load of the electric motor is reduced.

PROBLEMS THAT THE INVENTION INTENDS TO SOLVE

However, the problem with the above-described conventional fluid machine is that the assembly thereof is difficult because the compressor and the expander are coupled together by a single rotating shaft. In other words, it is impossible to fully make utilization of conventional assembly methods for compressor and expander units, thereby producing the problem that the assembly of the entire fluid machine becomes complicated.

With a view to coping with the above problem, it is conceivable to employ a method of dividing the driving shaft between the electric motor and the expander, in other words, a coupling construction is employed. However, the problem with this method is that there is the possibility of the occurrence of lubricating oil leakage from the coupling portion, because the oil supply groove formed in the driving shaft extends across the coupling portion.

With the above problems in mind, the present invention was made. Accordingly, an object of the present invention is to prevent, even when the driving shaft employs a divisional construction, the occurrence of lubricating oil leakage in the driving shaft coupling portion.

DISCLOSURE OF THE INVENTION

The present invention provides, as problem solving means, the following aspects.

The present invention provides, as a first aspect, a fluid machine comprising a casing (31), the casing (31) containing therein a compression mechanism (50) for compressing fluid and an expansion mechanism (60) for generating rotational power by the expansion of fluid.

In the fluid machine of the first aspect, a rotating shaft (70) of the compression mechanism (50) and a rotating shaft (80) of the expansion mechanism (60) are coupled together. In addition, oil supply grooves (74, 84) in fluid communication with each other are formed respectively in the rotating shafts (70, 80) and a seal mechanism (S, R) for providing sealing between coupling portions of the rotating shafts (70, 80) is provided.

In the first aspect of the present invention, the rotating shafts (70, 80) are coupled together whereby rotational power generated in the expansion mechanism (60) is transmitted to the compression mechanism (50). By means of this, the load torque in the compression mechanism (50) is reduced.

Incidentally, the compression mechanism (50) and the expansion mechanism (60) are coupled together after completion of their assembly. In other words, the compression and expansion mechanisms (50, 60) are coupled together after manufacture by respective conventional assembly methods. In the case where the compression mechanism (50) and the expansion mechanism (60) are connected together by a single rotating shaft, their respective conventional assembly methods can hardly be employed and the assembly of the entire fluid machine becomes complicated. In the first aspect, however, the assembly is prevented from being complicated. The oil supply grooves (74, 84) of the rotating shafts (70, 80) fluidly communicate with each other at the coupling portions of the rotating shafts (70, 80). However, the seal mechanism (S, R) provides sealing between the coupling portions whereby, even when employing a rotating shaft divisional construction, lubricating oil leakage is assuredly prevented from occurring.

In addition, the present invention provides, as a second aspect according to the first aspect, a fluid machine in which the fluid machine is provided with a locating means (8) by which the rotating shafts (70, 80) are coupled together in a predetermined phase relation which permits correspondence between the compression stroke of the compression mechanism (50) and the expansion stroke of the expansion mechanism (60).

In the second aspect of the present invention, the compression torque in the compression stroke and the expansion torque, as rotational power, in the expansion stroke are subjected to variation. If maximum rotational power, generated in the expansion mechanism (60) when the compression torque is at the peak value, is transmitted to the compression mechanism (50), this provides an optimal efficiency of operation. In other words, if the locating means (8) is set so that the rotating shafts (70, 80) are coupled together in a predetermined phase relation which permits correspondence between the phase of the rotating shaft (70) of the compression mechanism (50) in which the compression torque reaches its peak value and the phase of the rotating shaft (80) of the expansion mechanism (60) in which the expansion torque reaches its peak value, this assuredly and easily provides an optimal efficiency of operation.

In addition, the present invention provides, as a third aspect according to the second aspect, a fluid machine in which the rotating shaft (80) has a shaft end with a convex portion (85) and the rotating shaft (70) has a shaft end with a concave portion (75) into which the convex portion (85) is engaged. In addition, the seal mechanism (S, R) comprises (i) a seal groove (S) formed in a peripheral surface of either one of the convex portion (85) and the concave portion (75) over the circumferential direction and (ii) a seal member (R) engaged into the seal groove (S).

In the third aspect of the present invention, the rotating shafts (70, 80) are coupled together by engagement of the convex portion (85) and the concave portion (75). This therefore facilitates coupling together the rotating shafts (70, 80), because there is no need to use a shaft coupling such as a coupling or the like. By means of this, the assembly step is simplified. In addition, since the seal member (R) provides sealing between the convex portion (85) and the concave portion (75), this ensures that the occurrence of lubricating oil leakage from the oil supply grooves (74, 84) is prevented.

In addition, the present invention provides, as a fourth aspect according to the third aspect, a fluid machine in which the convex portion (85) is provided with a power transmitting convex portion (87) for transmitting rotational power, the power transmitting convex portion (87) having a polygonal shape when viewed in cross section, and the concave portion (75) is provided with a power transmitting concave portion (77) into which the power transmitting convex portion (87) is engaged.

In addition to the above, the locating means (8) comprises (i) a rod-shaped locating pin (88) which is mounted eccentrically from the center of one of the rotating shafts (70, 80) in its shaft end surface and (ii) a pin hole (78) which is formed in the other of the rotating shafts (70, 80) and into which the locating pin (88) is engaged.

In the fourth aspect of the present invention, the polygonal power transmitting convex portion (87) and the power transmitting concave portion (77) engage with each other whereby it is ensured that rotational power is transmitted to the rotating shaft (70) of the compression mechanism (50) without the occurrence of idling of the rotating shaft (80) of the expansion mechanism (60). Stated another way, the power transmitting convex portion (87), the power transmitting concave portion (77), and so on constitute a so-called rotation preventing means for preventing the rotating shaft (80) of the expansion mechanism (60) from independently rotating. In addition, since the locating pin (88) is mounted eccentrically from the center of axle of the rotating shafts (70, 80) whereby the rotating shafts (70, 80) are coupled together constantly in a unique phase relation by engagement of the locating pin (88) and the pin hole (78). Therefore, if the forming position of the locating pin (88) and the pin hole (78) is set so that the rotating shafts (70, 80) are coupled together in a predetermined phase relation, this ensures that the efficiency of operation is optimized.

In addition, the present invention provides, as a fifth aspect according to the third aspect, a fluid machine in which the locating means (8) comprises (i) a key portion (8a) formed in a peripheral surface of one of the convex portion (85) and the concave portion (75) and (ii) a key groove (7a) formed in a peripheral surface of the other of the convex portion (85) and the concave portion (75).

In the fifth aspect of the present invention, rotational power of the expansion mechanism (60) is transmitted to the rotating shaft (70) of the compression mechanism (50) by engagement of the key portion (8a) and the key groove (7a). Furthermore, when the key portion (8a) and the key groove (7a) engage with each other, the rotating shafts (70, 80) are coupled together constantly in a unique phase relation. Therefore, if the forming position of the key portion (8a) and the key groove (7a) is set so that the rotating shafts (70, 80) are coupled together in a predetermined phase relation, this ensures that the efficiency of operation is optimized.

In addition, the present invention provides, as a sixth aspect according to either the fourth aspect or the fifth aspect, a fluid machine in which an electric motor (40) for activating the compression mechanism (50) is connected to the compression mechanism (50) by the rotating shaft (70) of the compression mechanism (50).

In the sixth aspect of the present invention, the electric motor (40) is connected to the compression mechanism (50) by a single rotating shaft, i.e., the rotating shaft (70). This therefore facilitates connecting the expansion mechanism (60) to a conventional existing fluid machine in which the compressor is integral with the electric motor.

In addition, the present invention provides, as a seventh aspect according to the sixth aspect, a fluid machine in which the power transmitting convex portion (87) of the convex portion (85) and the power transmitting concave portion (77) of the concave portion (75) are surface-hardened.

In the seventh aspect of the present invention, the power transmitting convex portion (87) and the power transmitting concave portion (77) are improved in the resistance to surface pressure by surface-hardening. It is therefore ensured that rotational power is transmitted without causing any damage, regardless of the arrangement that the rotating shafts (70, 80) are coupled together using a simple construction.

In addition, the present invention provides, as an eighth aspect according to the sixth aspect, a fluid machine in which the fluid machine is used in a refrigerant circuit (20) in which refrigerant is circulated whereby a vapor compression refrigeration cycle is performed.

In the eighth aspect of the present invention, the fluid machine is used in the refrigerant circuit (20) of the air conditioner and the compression and expansion strokes of the vapor compression refrigeration cycle are carried out.

In addition, the present invention provides, as a ninth aspect according to the eighth aspect, a fluid machine in which the refrigerant is carbon dioxide.

In the ninth aspect of the present invention, carbon dioxide is used as a refrigerant circulating in the refrigerant circuit (20), thereby making it possible to provide earth-conscious equipment and apparatuses. Especially, for the case of carbon dioxide, it is compressed to its critical pressure state and the compression torque (load torque) correspondingly increases; however, the compression torque is reduced without fail.

ADVANTAGEOUS EFFECTS

According to the first aspect of the present invention, it is arranged such that the compression mechanism (50) and the expansion mechanism (60) are coupled together by connecting together the rotating shaft (70) and the rotating shaft (80), in other words, the rotating shafts (70, 80) are constructed separately from each other. As a result of such arrangement, the rotating shafts (70, 80) can be coupled together after individual assembly of each equipment, thereby making it possible to simplify the assembly of the fluid machine. Furthermore, the seal mechanism (S, R) for providing sealing between the coupling portions of the rotating shafts (70, 80) having the oil supply grooves (74, 84) is provided whereby lubricating oil leakage from the oil supply grooves (74, 84) is prevented, regardless of the arrangement that the rotating shafts (70, 80) have separate structures. As a result of this, the cost of assembly can be reduced and the reliability of equipment can be improved.

In addition, according to the second aspect of the present invention, the locating means (8) is provided in order that the rotating shafts (70, 80) may be coupled together in a predetermined phase relation which permits correspondence between the compression stroke of the compression mechanism (50) and the expansion stroke of the expansion mechanism (60), whereby maximum rotational power generated in the expansion mechanism (60) when the compression torque is at the peak value can be transmitted. This therefore makes it possible to perform operation at an optimal efficiency without fail.

Additionally, according to the third aspect of the present invention, the rotating shafts (70, 80) are coupled together by engagement of the convex portion (85) and the concave portion (75), thereby facilitating coupling together the rotating shafts (70, 80) without using a shaft coupling such as a coupling or the like. This therefore makes it possible to reduce the cost of assembly to a further extent. In addition, the seal member (R) provides sealing between the convex portion (85) and the concave portion (75) which are in engagement with each other, whereby it is ensured that lubricating oil leakage from the oil supply grooves (74, 84) is prevented.

In addition, according to the fourth aspect of the present invention, the convex portion (85) is provided with the power transmitting convex portion (87) having a polygonal shape when viewed in cross section while the concave portion (75) is provided with the power transmitting concave portion (77) into which the power transmitting convex portion (87) is engaged, whereby it is ensured that rotational power is transmitted to the compression mechanism (50) without the occurrence of idling of the expansion rotating shaft (80) of the expansion mechanism (60).

Besides, according to the fourth aspect of the present invention, the locating means (8) is made up of the rod-shaped locating pin (88) which is mounted eccentrically from the center of axle of one of the rotating shafts (70, 80) in its shaft end surface and the pin hole (78) which is formed in the other of the rotating shafts (70, 80) and into which the locating pin (88) is engaged, whereby the rotating shafts (70, 80) can be coupled together constantly in a unique, predetermined phase relation. This therefore ensures that the efficiency of operation is optimized.

In addition, according to the fifth aspect of the present invention, the locating means (8) is made up of the key portion (8a) which is formed in a peripheral surface of one of the convex and concave portions (85, 75) and the key groove (7a) which is formed in a peripheral surface of the other portion, whereby the rotating shafts (70, 80) can be coupled together constantly in a unique, predetermined phase relation. This therefore ensures that the efficiency of operation is optimized.

In addition, according to the sixth aspect of the present invention, the electric motor (40) is connected to the compression mechanism (50) by a single shaft, i.e., the rotating shaft (70), thereby making it possible to achieve easy connection of the expansion mechanism (60) with a conventional existing fluid machine in which the compressor is integral with the electric motor. This therefore makes it possible to reduce the load of the electric motor (40).

In addition, according to the seventh aspect of the present invention, the power transmitting convex and concave portions (87, 77) are surface-hardened whereby, although the rotating shafts (70, 80) are coupled together using a simple construction, it is possible to reliably transfer rotational power without causing any damage to their coupling portions.

Additionally, according to the eighth aspect of the present invention, the fluid machine is used in a refrigerant circuit, such as the refrigerant circuit (20), for air conditioners or the like, thereby making it possible to provide a highly reliable apparatus while reducing the cost thereof.

In addition, according to the ninth aspect of the present invention, carbon dioxide is used as a refrigerant circulating in the refrigerant circuit (20), thereby making it possible to provide earth-conscious equipment and apparatuses. Especially, for the case of carbon dioxide, it is compressed to its critical pressure state and, as a result, the load torque (compression torque) in the compression mechanism (50) correspondingly increases; however, the load torque is reduced without fail.

BRIEF DESCRIPTION OF THE DRAWINGS

FIG. 3, comprised of FIG. 3(a) and FIG. 3(b), shows a coupling portion of an expansion rotating shaft according to a first embodiment of the present invention, wherein

FIG. 4, comprised of FIG. 4(a) and FIG. 4(b), shows a coupling portion of a compression rotating shaft according to the first embodiment, wherein

FIG. 5, comprised of FIG. 5(a) and FIG. 5(b), shows a coupling portion of an expansion rotating shaft according to a second embodiment of the present invention, wherein

FIG. 6, comprised of FIG. 6(a) and FIG. 6(b), shows a coupling portion of a compression rotating shaft according to the second embodiment, wherein

FIG. 7, comprised of FIG. 7(a) and FIG. 7(b), shows a coupling portion of an expansion rotating shaft according to a third embodiment of the present invention, wherein

FIG. 8, comprised of FIG. 8(a) and FIG. 8(b), shows a coupling portion of a compression rotating shaft according to the third embodiment, wherein

FIG. 9, comprised of FIG. 9(a) and FIG. 9(b), shows a coupling portion of an expansion rotating shaft according to a fourth embodiment of the present invention, wherein FIG. 10, comprised of FIG. 10(a) and FIG. 10(b), shows a coupling portion of a compression rotating shaft according to the fourth embodiment, wherein

BEST EMBODIMENT MODE FOR CARRYING OUT THE INVENTION

In the following, preferred embodiments of the present invention will be described in detail with reference to the accompanying drawings.

First Embodiment of the Invention

Description will be made in regard to a first embodiment of the present invention. An air conditioner (10) of the first embodiment is equipped with a fluid machine according to the present invention.

Overall Structure of the Air Conditioner

Figure 1:
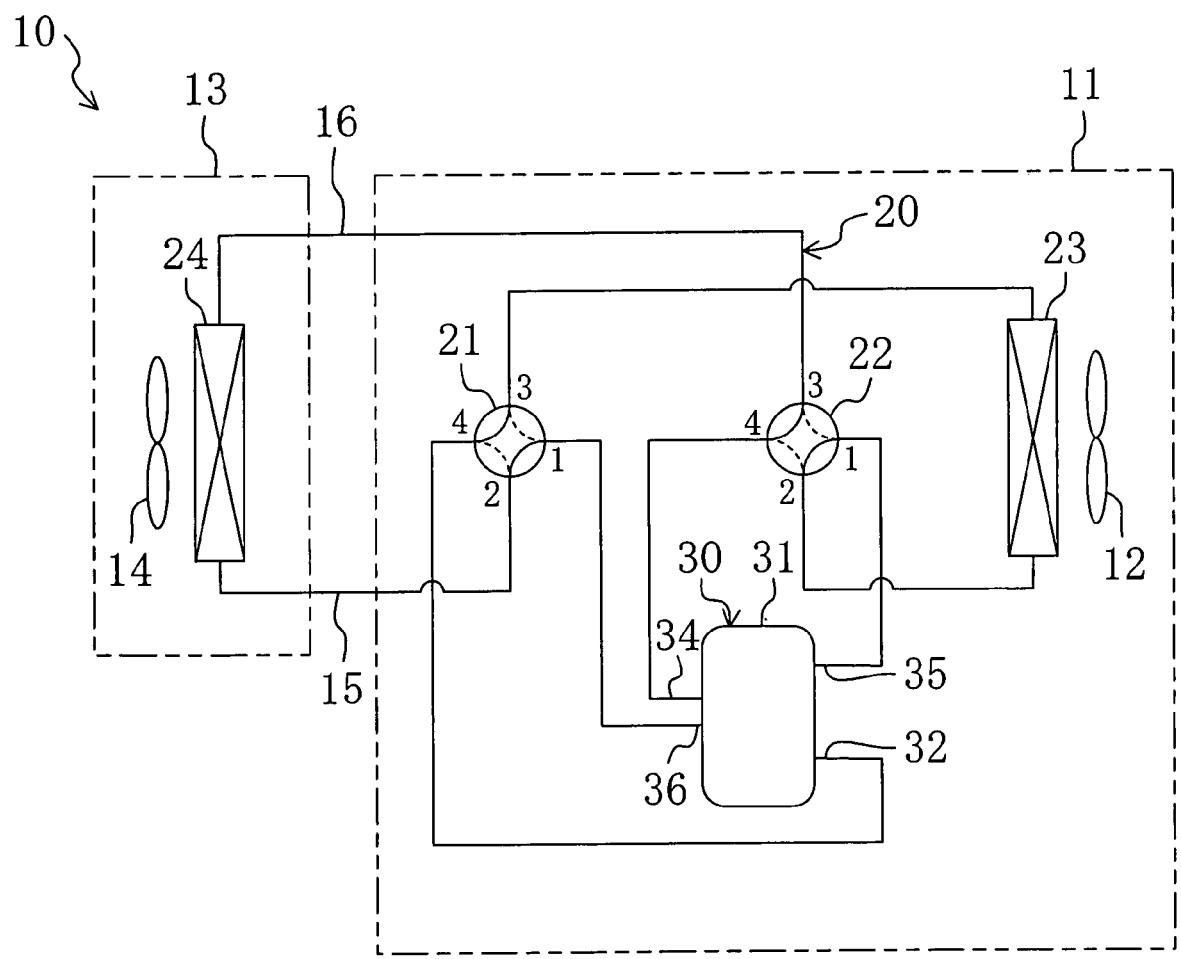
FIG. 1 is a plumbing diagram showing an air conditioner according to an embodiment of the present invention.

As shown in FIG. 1, the air conditioner (10) is a so-called "separate type", and is equipped with an outdoor unit (11) and an indoor unit (13). The outdoor unit (11) houses therein an outdoor fan (12), an outdoor heat exchanger (23), a first four-way switch valve (21), a second four-way switch valve (22), and a compression/expansion unit (30). On the other hand, the indoor unit (13) houses therein an indoor fan (14) and an indoor heat exchanger (24). The outdoor unit (11) is installed outside a building. The indoor unit (13) is installed inside the building. In addition, the outdoor unit (11) and the indoor unit (13) are connected together by a pair of interunit lines (15, 16). The compression/expansion unit (30) will be described later in detail.

The air conditioner (10) is equipped with a refrigerant circuit (20). The refrigerant circuit (20) is a closed circuit in which the compression/expansion unit (30), the indoor heat exchanger (24) and so on are connected. Additionally, the refrigerant circuit (20) is filled up with carbon dioxide ($CO_2$) as a refrigerant. The refrigerant is circulated in the refrigerant circuit (20) whereby a vapor compression refrigeration cycle is performed.

Both the outdoor heat exchanger (23) and the indoor heat exchanger (24) are fin and tube heat exchangers of the cross fin type. In the outdoor heat exchanger (23), refrigerant circulating in the refrigerant circuit (20) exchanges heat with outdoor air taken in by the outdoor fan (12). In the indoor heat exchanger (24), refrigerant circulating in the refrigerant circuit (20) exchanges heat with indoor air taken in by the indoor fan (14).

The first four-way switch valve (21) has four ports of which the first port is connected to a discharge pipe (36) of the compression/expansion unit (30); the second port is connected through the interunit line (15) to one end of the indoor heat exchanger (24) which is a gas side end; the third port is connected to one end of the outdoor heat exchanger (23) which is a gas side end; and the fourth port is connected to a suction port (32) of the compression/expansion unit (30). And, the first four-way switch valve (21) is selectively switchable between a first state (indicated by solid line in FIG. 1) that allows fluid communication between the first port and the second port and fluid communication between the third port and the fourth port and a second state (indicated by broken line in FIG. 1) that allows fluid communication between the first port and the third port and fluid communication between the second port and the fourth port.

The second four-way switch valve (22) has four ports of which the first port is connected to an outflow port (35) of the compression/expansion unit (30); the second port is connected to the other end of the outdoor heat exchanger (23) which is a liquid side end; the third port is connected through the interunit line (16) to the other end of the indoor heat exchanger (24) which is a liquid side end; and the fourth port is connected to an inflow port (34) of the compression/expansion unit (30). And, the second four-way switch valve (22) is selectively switchable between a first state (indicated by solid line in FIG. 1) that allows fluid communication between the first port and the second port and fluid communication between the third port and the fourth port and a second state (indicated by broken line in FIG. 1) that allows fluid communication between the first port and the third port and fluid communication between the second port and the fourth port.

The refrigerant circuit (20) is configured such that its operation is selectively switched between the cooling operation mode and the heating operation mode by the switching of the two four-way switch valves (21, 22). In other words, when both the two four-way switch valves (21, 22) change their state to the state indicated by broken line of FIG. 1, refrigerant is circulated in the refrigerant circuit (20) to perform a cooling mode of operation in which the outdoor heat exchanger (23) functions as a gas cooler (cooler) and the indoor heat exchanger (24) functions as an evaporator. On the other hand, when both the two four-way switch valves (21, 22) change their state to the state indicated by solid line of FIG. 1, refrigerant is circulated in the refrigerant circuit (20) to perform a heating mode of operation in which the outdoor heat exchanger (23) functions as an evaporator and the indoor heat exchanger (24) functions as a gas cooler (cooler).

Structure of the Compression/Expansion Unit

Figure 2:
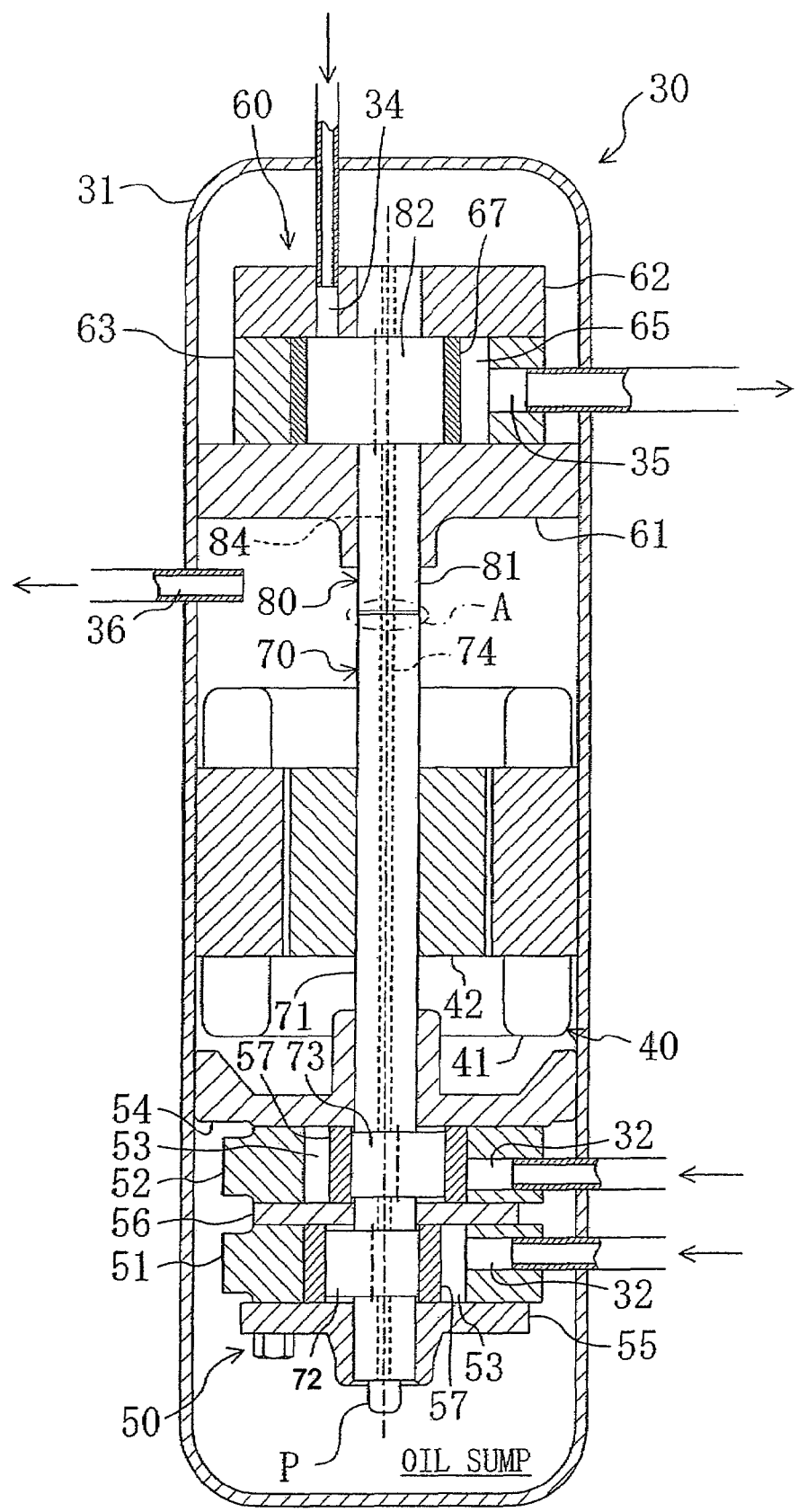
FIG. 2 is a longitudinal cross sectional view showing a compression/expansion unit according to an embodiment of the present invention.

As shown in FIG. 2, the compression/expansion unit (30) constitutes a fluid machine according to the present invention and includes a casing (31) which is a vertically long, cylinder-shaped, hermetically-closed container. Arranged, in a bottom-to-top order, within the casing (31) are a compression mechanism (50), an electric motor (40), and an expansion mechanism (60).

The discharge pipe (36) is connected to the casing (31). The discharge pipe (36) is arranged between the electric motor (40) and the expansion mechanism (60) and fluidly communicates with the internal space of the casing (31).

The electric motor (40) is disposed centrally in the casing (31) relative to the longitudinal direction thereof. The electric motor (40) is made up of a stator (41) and a rotor (42). The stator (41) is firmly secured to the internal surface of the casing (31). The rotor (42) is disposed inside the stator (41).

The compression mechanism (50) constitutes a rotary compressor of the swinging piston type. The compression mechanism (50) has two cylinders (51, 52) and two rotary pistons (57, 57). In the compression mechanism (50), a rear head (55), a first cylinder (51), an intermediate plate (56), a second cylinder (52), and a front head (54) are layered one upon the other in a bottom-to-top order. The first and second cylinders (51, 52) each contain therein a respective cylinder-shaped rotary piston (57). Although not shown diagrammatically in the figure, the rotary pistons (57, 57) have flat plate-like blades projectingly formed on their side surfaces. These blades are rotatably retractably supported, through swinging bushes, on the cylinders (51, 52), respectively.

The compression mechanism (50) has a compression rotating shaft (70) which is a rotating shaft. The compression rotating shaft (70) has a main shaft part (71) and two greater diameter eccentric parts (72, 73) are formed on the lower end side of the main shaft part (71). The main shaft part (71) is passed through each of the layered components, in other words, the main shaft part (71) is passed through the rear head (55), then through the first cylinder (51), then through the intermediate plate (56), then through the second cylinder (52), and then through the front head (54) and the greater diameter eccentric parts (72, 73) are located, respectively, in the first and second cylinders (51, 52).

The two greater diameter eccentric parts (72, 73) are formed such that they have a greater diameter than that of the main shaft part (71) and are formed eccentrically relative to the center of axle of the main shaft part (71). Of the two greater diameter eccentric parts (72, 73), the lower one constitutes a lower side greater diameter eccentric part (72) and the upper one constitutes an upper side greater diameter eccentric part (73). The lower side greater diameter eccentric part (72) and the upper side greater diameter eccentric part (73) are opposite to each other in the direction of eccentricity relative to the center of axle of the main shaft part (71).

The lower side greater diameter eccentric part (72) engages with the rotary piston (57) within the first cylinder (51) while on the other hand the upper side greater diameter eccentric part (73) engages with the rotary piston (57) within the second cylinder (52). The rotary piston (57) within the first cylinder (51) is, at its inner peripheral surface, in sliding contact with the outer peripheral surface of the lower side greater diameter eccentric part (72) and is, at its outer peripheral surface, in sliding contact with the inner peripheral surface of the first cylinder (51). On the other hand, the rotary piston (57) within the second cylinder (52) is, at its inner peripheral surface, in sliding contact with the outer peripheral surface of the upper side greater diameter eccentric part (73) and is, at its outer peripheral surface, in sliding contact with the inner peripheral surface of the second cylinder (52). And, compression chambers (53, 53) are defined, respectively, between the outer peripheral surface of the rotary piston (57) within the first cylinder (51) and the inner peripheral surface of the first cylinder (51) and between the outer peripheral surface of the rotary piston (57) within the second cylinder (52) and the inner peripheral surface of the second cylinder (52).

Each of the first and second cylinders (51, 52) is provided with a respective suction port (32). The suction ports (32, 32) radially extend through the first and second cylinders (51,52) respectively, with their terminating ends opening into the first and second cylinders (51, 52) respectively. In addition, the suction ports (32, 32) are each extended to outside the casing (31) by piping.

Each of the front and rear heads (54, 55) is provided with a respective discharge port (not shown). The discharge port of the front head (54) allows the compression chamber (53) within the second cylinder (52) and the internal space of the casing (31) to fluidly communicate with each other. On the other hand, the discharge port of the rear head (55) allows the compression chamber (53) within the first cylinder (51) and the internal space of the casing (31) to fluidly communicate with each other. In addition, each of the discharge ports is provided, at its terminating end, with a respective discharge valve (not shown) implemented by a reed valve and is placed in the open or closed state by the discharge valve. And, high-pressure gas refrigerant discharged into the internal space of the casing (31) from the compression mechanism (50) is delivered out of the compression/expansion unit (30) by way of the discharge pipe (36).

The main shaft part (71) of the compression rotating shaft (70) is passed, at its upper end side, through the center of the rotor (42) of the electric motor (40). In other words, the compression mechanism (50) and the electric motor (40) are mechanically coupled together by a single rotating shaft, i.e., the compression rotating shaft (70). Therefore, rotational power of the electric motor (40) is transmitted by the compression rotating shaft (70) to the compression mechanism (50) whereby the compression mechanism (50) is activated.

The expansion mechanism (60) constitutes a rotary expander of the swinging piston type. The expansion mechanism (60) includes a front head (61), a rear head (62), a cylinder (63), and a rotary piston (67). In the expansion mechanism (60), the front head (61), the cylinder (63), and the rear head (62) are layered one upon the other in a bottom-to-top order. The lower and upper end surfaces of the cylinder (63) are blocked respectively by the front and rear heads (61, 62). The rotary piston (67) is shaped like a circular ring or a cylinder and is housed within the closed cylinder (63). And, although not diagrammatically represented in the figure, the rotary piston (67), like its counterpart of the compression mechanism (50), is provided, in its side surface, with a projecting blade shaped like a flat plate. The blade is rotatably retractably supported on the cylinder (63) through a swinging bush.

The expansion mechanism (60) has an expansion rotating shaft (80) which is a rotating shaft. The expansion rotating shaft (80) has a main shaft part (81) and a greater diameter eccentric part (82) is formed somewhat nearer the upper end of the main shaft part (81). The main shaft part (81) is passed through each of the layered components, in other words, the main shaft part (81) is passed through the front head (61), then through the cylinder (63), and then through the rear head (62) and the greater diameter eccentric part (82) is located within the cylinder (63).

The greater diameter eccentric part (82) is formed such that it has a greater diameter than that of the main shaft part (81) and is formed eccentrically relative to the center of axle of the main shaft part (81). The greater diameter eccentric part (82) engages with the rotary piston (67) within the cylinder (63). The rotary piston (67) is, at its inner peripheral surface, in sliding contact with the outer peripheral surface of the greater diameter eccentric part (82) and is, at its outer peripheral surface, in sliding contact with the inner peripheral surface of the cylinder (63). There is defined a compression chamber (65) between the outer peripheral surface of the rotary piston (67) and the inner peripheral surface of the cylinder (63). In the expansion mechanism (60), power generated by the expansion of refrigerant is converted into rotational power of the expansion rotating shaft (80).

The expansion mechanism (60) has the inflow port (34) formed in the rear head (62) and the outflow port (35) formed in the cylinder (63). The inflow port (34) extends vertically through the rear head (62), with its terminating end opening into the inside of the compression chamber (65) within the cylinder (63). On the other hand, the outflow port (35) radially extends through the cylinder (63), with its terminating end opening into the inside of the compression chamber (65) within the cylinder (63). In addition, the inflow and outflow ports (34, 35) are extended to outside the casing (31) by piping.

The compression rotating shaft (70) and the expansion rotating shaft (80) are coupled together whereby the compression mechanism (50) and the electric motor (40) are mechanically connected to the expansion mechanism (60) (see section A of FIG. 2). Stated another way, the upper end of the main shaft part (71) of the compression rotating shaft (70) and the lower end of the main shaft part (81) of the expansion rotating shaft (80) are coupled together. By means of this, rotational power of the expansion rotating shaft (80) is transmitted through the compression rotating shaft (70) to the compression mechanism (50). The coupling portions of the rotating shafts (70, 80) will be described later in detail.

Oil supply grooves (74, 84) fluidly communicating with each other are formed inside the main shaft parts (71, 81) of the rotating shafts (70, 80), respectively. Each oil supply groove (74, 84) is so formed as to extend from the upper to the lower end of each main shaft part (71, 81). An oil sump in which lubricating oil is collected is formed at the bottom of the casing (31). Mounted at the lower end of the main shaft part (71) of the compression rotating shaft (70) is a centrifugal oil pump (P) dipped in the oil sump. The oil pump (P) is configured such that it pumps up lubricating oil in the oil sump by rotation of the compression rotating shaft (70). The oil supply groove (74, 84) of the main shaft part (71, 81) is formed such that lubrication oil pumped up by the oil pump (P) is supplied to sliding parts of the compression and expansion mechanisms (50, 60).

Figure 3A:
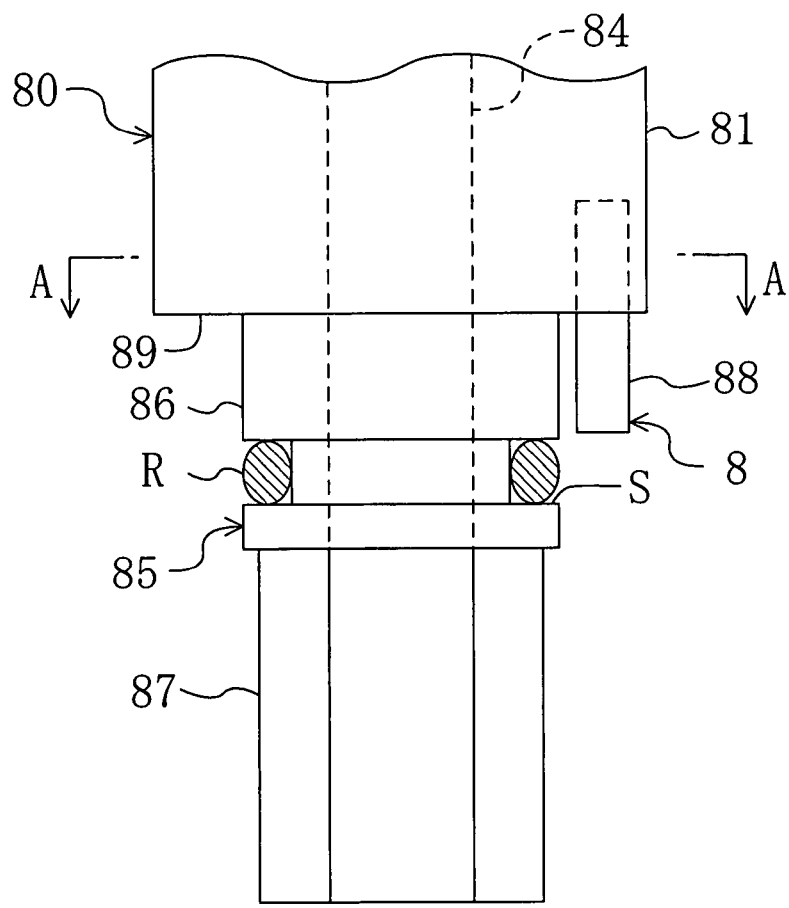
FIG. 3(a) is a top plan view and FIG. 3(b) is a cross sectional view taken along the line A-A of FIG. 3(a)
Figure 3B:
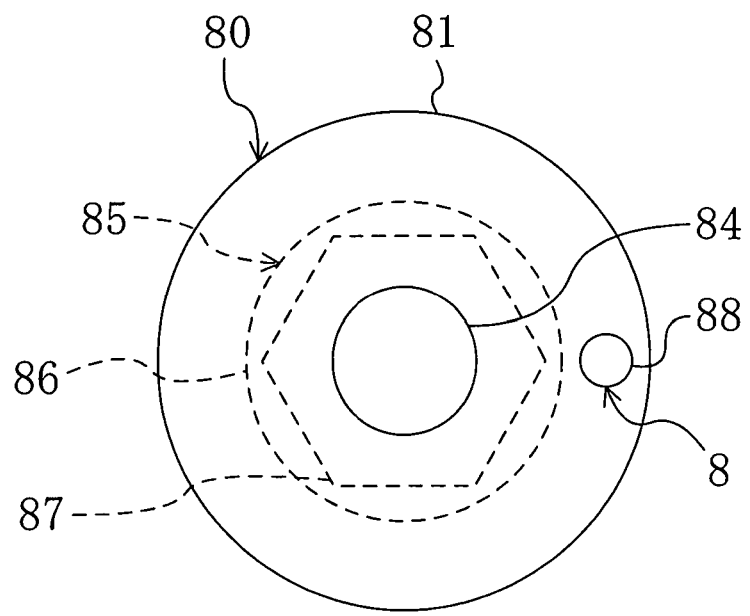
Figure 4A:
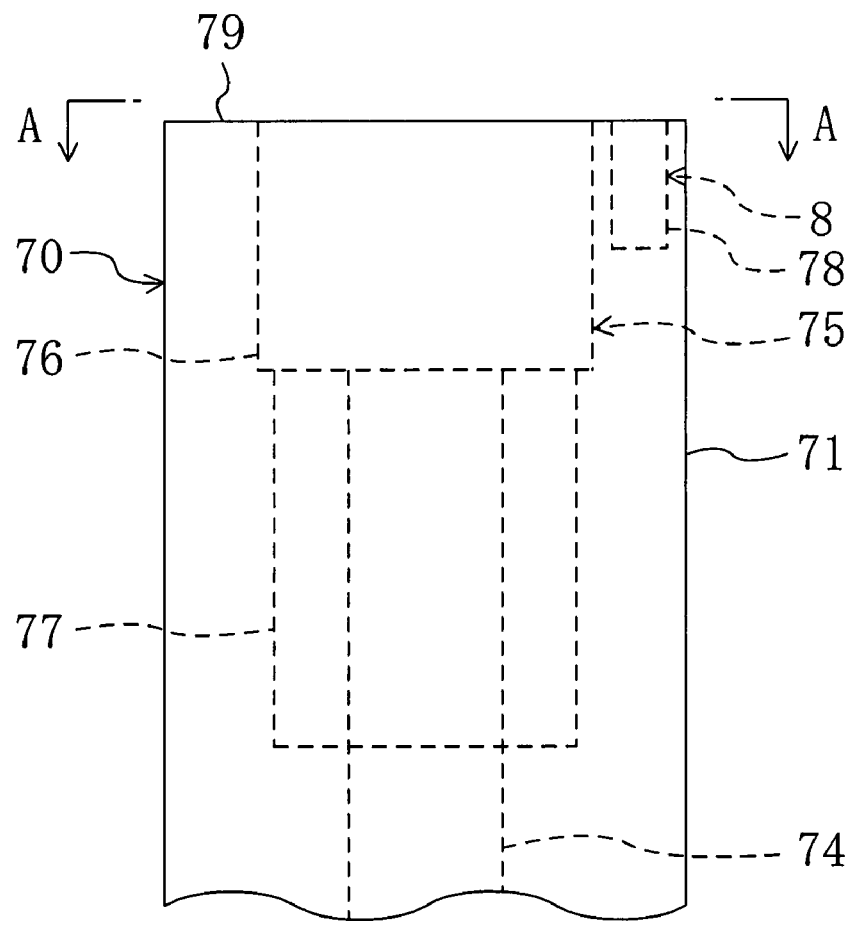
FIG. 4(a) is a top plan view and FIG. 4(b) is a cross sectional view taken along the line A-A of FIG. 4(a)
Figure 4B:
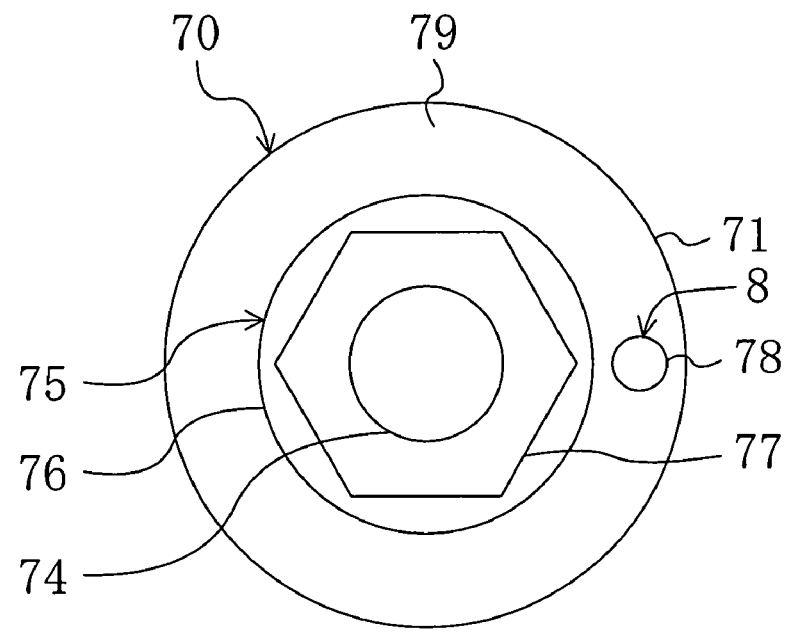

As shown in FIG. 3 and FIG. 4, the main shaft parts (71, 81) of the rotating shafts (70, 80) are coupled together by engagement. And, provided, as a feature of the present invention, in these coupling portions are a seal mechanism (S, R) and a locating means (8).

More specifically, an engagement convex portion (85) is formed at the lower end of the main shaft part (81) of the expansion rotating shaft (80) and an engagement concave portion (75) into which the engagement convex portion (85) is engaged is formed at the upper end of the main shaft part (71) of the compression rotating shaft (70).

The entire engagement convex portion (85) is formed such that it has a smaller diameter than the outside diameter of the main shaft part (81). And, the engagement convex portion (85) projects axially outwardly. The engagement convex portion (85) is made up of a base part (86) formed continuously with the main shaft part (81) and a power transmitting convex portion (87) formed continuously with the base part (86). The base part (86), formed in the shape of a circle when viewed in cross section, is extended axially. The power transmitting convex portion (87), formed in the shape of a regular hexagon when viewed in cross section, is extended axially.

The entire engagement concave portion (75) is formed such that it is concaved axially from a shaft end surface (79) of the main shaft part (71). The engagement concave portion (75) is made up of a base hole part (76) and a power transmitting concave portion (77) formed continuously with the base hole part (76) which are located in that order from the shaft end surface (79). The base hole part (76) is formed such that it has a shape and dimensions so that the base part (86) of the engagement convex portion (85) is engaged into the base hole part (76), almost without clearance. On the other hand, the power transmitting concave portion (77) is formed such that it has a shape and dimensions so that the power transmitting convex portion (87) of the engagement convex portion (85) is engaged into the power transmitting concave portion (77), almost without clearance. As described above, the power transmitting convex and concave portions (87, 77) are each formed in the shape of a polygon when viewed in cross section whereby it is ensured that rotational power of the expansion rotating shaft (80) is transmitted to the compression rotating shaft (70) without the occurrence of idling of the expansion rotating shaft (80). To sum up, the power transmitting convex portion (87), the power transmitting concave portion (77) and so on constitute a so-called rotation preventing means for preventing the rotating shafts (70, 80) from independently rotating.

In addition, the power transmitting convex and concave portions (87, 77) are surface-hardened, for example, by hardening. Because of this, the resistance to surface pressure of the power transmitting convex and concave portions (87, 77) is improved, thereby making it possible to reliably transfer rotational power without causing any damage to the coupling portions of the power transmitting convex and concave portions (87, 77).

One of the oil supply grooves (74, 84) of the main shaft parts (71, 81) opens to the bottom surface of the power transmitting concave portion (77) while the other of the oil supply grooves (74, 84) opens to the end surface of the power transmitting convex portion (87). Consequently, by engagement of the power transmitting convex portion (87) and the power transmitting concave portion (77), the oil supply grooves (74, 84) of the main shaft parts (71, 81) are connected together.

The seal mechanism (S, R) is mounted in the base part (86) of the engagement convex portion (85). The seal mechanism (S, R) is composed of a seal groove (S) and an O-ring (R). The seal groove (S) is formed in the outer peripheral surface of the base part (86) over the circumferential direction and the O-ring (R) as a seal member is engaged into the seal groove (S). In other words, by contact of the O-ring (R) with the seal groove (S) and with the internal peripheral surface of the base part (76), sealing is provided between the base part (86) and the base hole part (76). This therefore makes it possible to prevent the outflow of lubricating oil from the connecting portion of the oil supply grooves (74, 84) from leaking from between the base part (86) and the base hole part (76), i.e., from between the coupling portions of the rotating shafts (70, 80).

The locating means (8) is composed of a locating pin (88) mounted in the main shaft part (81) of the expansion rotating shaft (80) and a pin hole (78) defined in the main shaft part (71) of the compression rotating shaft (70).

The locating pin (88) is mounted in a stepped end surface (89) which is an end surface where the base part (86) of the main shaft part (81) is formed. The locating pine (88) is shaped like a circular cylinder-like rod and is inserted into the stepped end surface (89) in the axial direction of the mains shaft part (81). In other words, approximately half of the locating pine (88) projects axially outwardly from the stepped end surface (89). On the other hand, the pin hole (78) is formed in the shaft end surface (79) of the main shaft part (71). The pin hole (78) is so formed as to permit the locating pin (88) to be engaged thereinto. Stated another way, the pin hole (88) is formed into a circular shape in cross section having approximately the same diameter as that of the locating pin (88) and is formed such that it has a length corresponding at least to that of the projecting portion of the locating pin (88).

The forming location of the locating pin (88) and the pin hole (78) is determined so that the rotating shafts (70, 80) are coupled together in a predetermined phase relation. If, in this type of fluid machinery, maximum rotational power, generated in the expansion mechanism (60) when the load torque is at the peak value, is transmitted, this provides an optimal efficiency of operation. Therefore, the locating pin (88) and the pin hole (78) are arranged so that the rotating shafts (70, 80) are coupled together, with a correspondence between the phase of the compression rotating shaft (70) in which the compression torque in the compression stroke reaches its peak value and the phase of the expansion rotating shaft (80) in which the expansion torque as rotational power in the expansion stroke reaches its peak value.

Running Operation

In the following, description will be made in regard to the operation of the air conditioner (10) during a cooling operation mode, then in regard to the operation of the air conditioner (10) during a heating operation mode, and then in regard to the operation of the compression/expansion unit (30).

Cooling Operation Mode

During the cooling operation mode, the first and second four-way switch valves (21, 22) change their state to the state indicated by broken line in FIG. 1. In this state, the electric motor (40) of the compression/expansion unit (30) is energized, and a vapor compression refrigeration cycle is performed as refrigerant is circulated in the refrigerant circuit (20).

High-pressure refrigerant compressed in the compression mechanism (50) is discharged out of the compression/expansion unit (30) by way of the discharge pipe (36). In this state, the high-pressure refrigerant has a higher pressure than its critical pressure. The high-pressure refrigerant flows through the first four-way switch valve (21) to the outdoor heat exchanger (23) and dissipates heat to outdoor air. The high-pressure refrigerant after heat dissipation passes through the second four-way switch valve (22), flows into the expansion mechanism (60) from the inflow port (34), and is expanded. This expanded refrigerant now at low pressure flows out from the compression/expansion unit (30) by way of the outflow port (35) and is delivered through the second four-way switch valve (22) to the indoor heat exchanger (24). In the indoor heat exchanger (24), the inflow low-pressure refrigerant absorbs heat from indoor air and is evaporated into a gas refrigerant whereby the indoor air is cooled. And, the gas refrigerant passes through the first four-way switch valve (21) and is again drawn into the compression mechanism (50) from the suction port (32) where the gas refrigerant is compressed.

Heating Operation Mode

During the heating operation mode, the first and second four-way switch valves (21, 22) change their state to the state indicated by solid line in FIG. 1. In this state, the electric motor (40) of the compression/expansion unit (30) is energized, and a vapor compression refrigeration cycle is performed as refrigerant is circulated in the refrigerant circuit (20).

High-pressure refrigerant compressed in the compression mechanism (50) is discharged out of the compression/expansion unit (30) by way of the discharge pipe (36). In this state, the high-pressure refrigerant has a higher pressure than its critical pressure. The high-pressure refrigerant flows through the first four-way switch valve (21) to the indoor heat exchanger (24) and dissipates heat to indoor air whereby the indoor air is heated. The high-pressure refrigerant after heat dissipation passes through the second four-way switch valve (22), flows into the expansion mechanism (60) from the inflow port (34), and is expanded. This expanded refrigerant now at low pressure flows out from the compression/expansion unit (30) by way of the outflow port (35) and is delivered through the second four-way switch valve (22) to the outdoor heat exchanger (23). In the outdoor heat exchanger (23), the inflow low-pressure refrigerant absorbs heat from outdoor air and is evaporated to a gas refrigerant. And, the gas refrigerant passes through the first four-way switch valve (21) and is again drawn into the compression mechanism (50) from the suction port (32) where the gas refrigerant is compressed.

Operation of the Compression/Expansion Unit

The compression mechanism (50) is activated as rotational power of the electric motor (40) is transmitted by the compression rotating shaft (70). On the other hand, when high-pressure refrigerant is expanded in the expansion mechanism (60), its internal energy is converted into rotational power of the expansion rotating shaft (80). This rotational power is transmitted by the power transmitting convex and concave portions (87, 77) of the rotating shafts (70, 80) to the compression rotating shaft (79) without fail, thereby ensuring that the compression mechanism (50) is activated. Hereby, the power load of the electric motor (40) is reduced. Especially, since maximum rotational power, generated in the expansion stroke when the compression torque in the compression stroke reaches its peak value, is transmitted to the compression mechanism (50), this ensures that the operation is carried out at optimal operating efficiency.

In addition, lubricating oil is drawn up by the oil pump (P) as the compression rotating shaft (70) rotates. This lubricating oil sequentially flows through the oil supply grooves (74, 84) of the compression and expansion rotating shafts (70, 80) and is supplied to predetermined sliding parts of the compression and expansion mechanism (50, 60). In the coupling portions of the rotating shafts (70, 80), lubricating oil leakage is prevented by the seal mechanism (S, R), thereby ensuring that lubricating oil is supplied to the predetermined sliding parts.

Advantageous Effects of the First Embodiment

As described above, according to the first embodiment of the present invention, it is arranged such that the compression and expansion mechanisms (50, 60) are coupled together by connection of their rotating shafts (70, 80), in other words, the rotating shafts (70, 80) are constructed separately from each other. As a result of such arrangement, the rotating shafts (70, 80) can be coupled together after assembly of each equipment, thereby making it possible to simplify the assembly of the fluid machine.

In addition, the seal mechanism (S, R) for providing sealing between the coupling portions of the rotating shafts (70, 80) is provided whereby lubricating oil leakage from the oil supply grooves (74, 84) is prevented, regardless of the arrangement that the rotating shafts (70, 80) are constructed separately from each other. As a result of such arrangement, the cost of assembly is reduced and the reliability of equipment is improved. Especially, as the seal mechanism (S, R), the O-ring (R) for providing sealing between the convex and concave portions (85, 75) which are in engagement with each other is employed, thereby making it possible to prevent lubricating oil leakage from the oil supply grooves (74, 84) without failing.

In addition, the locating pin (88) and the pin hole (78) are provided in order that the rotating shafts (70, 80) may be coupled together in a predetermined phase relation which permits correspondence between the compression stroke of the compression mechanism (50) and the expansion stroke of the expansion mechanism (60), thereby making it possible to transfer maximum rotational power generated in the expansion mechanism (60) when the compression torque reaches its peak value. This therefore makes it possible to perform the operation at optimal efficiency without fail.

Additionally, the rotating shafts (70, 80) are coupled together by engagement of the convex portion (85) and the concave portion (75), thereby facilitating coupling together the rotating shafts (70, 80) without using a shaft coupling such as a coupling or the like. This therefore makes it possible to reduce the cost of assembly to a further extent.

Furthermore, the convex portion (85) is provided with the power transmitting convex portion (87) shaped like a polygon when viewed in cross section while the concave portion (75) is provided with the power transmitting concave portion (77) into which the power transmitting convex portion (87) is engaged, whereby it is ensured that rotational power is transmitted to the compression mechanism (50) without the occurrence of idling of the expansion rotating shaft (80) of the expansion mechanism.

Besides, the electric motor (40) is connected to the compression mechanism (50) by a single shaft, i.e., the rotating shaft (70), thereby making it possible to achieve easy connection of the expansion mechanism (60) and a conventional existing fluid machine in which the compressor is integral with the electric motor. This therefore makes it possible to reduce the load of the electric motor (40).

In addition, the power transmitting convex and concave portions (87, 77) are surface-hardened whereby, although the rotating shafts (70, 80) are coupled together by a simple construction, it is possible to reliably transfer rotational power without causing any damage to the coupling portions.

Additionally, carbon dioxide is used as a refrigerant which is circulated in the refrigerant circuit (20), thereby making it possible to provide earth-conscious equipment and apparatuses. Especially, for the case of carbon dioxide, it is compressed to its critical pressure state, and although the load torque (compression torque) in the compression mechanism (50) correspondingly increases it is possible to reduce the load torque without fail.

Second Embodiment of the Invention

Figure 5A:
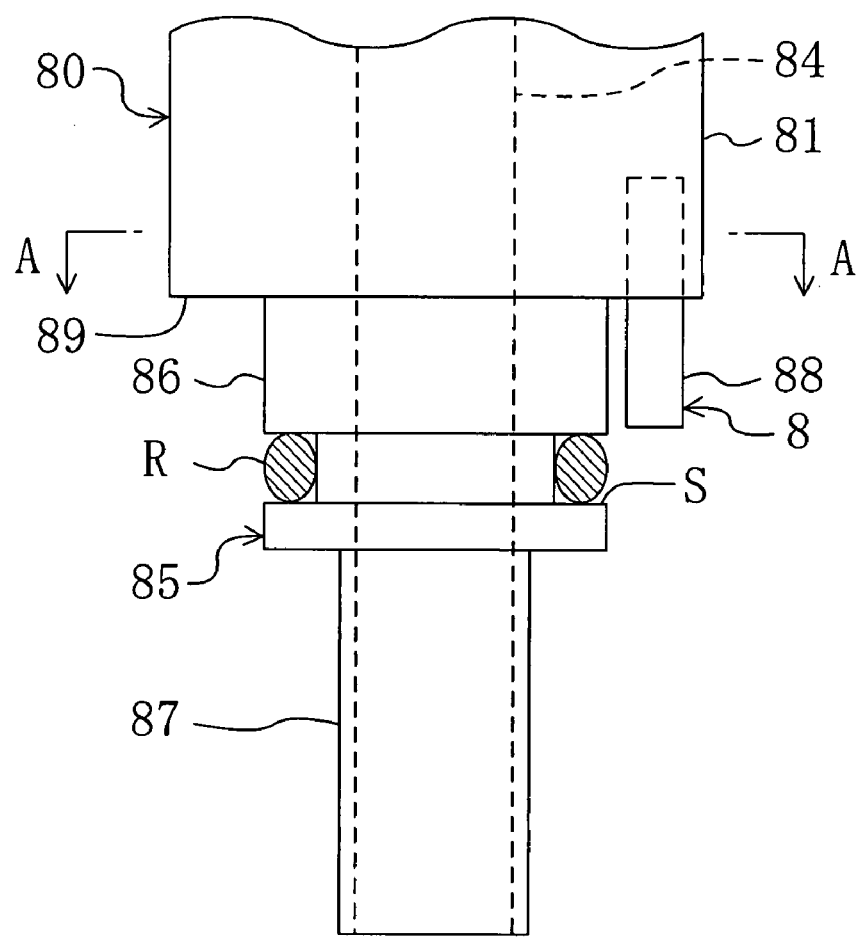
FIG. 5(a) is a top plan view and FIG. 5(b) is a cross sectional view taken along the line A-A of FIG. 5(a)
Figure 5B:
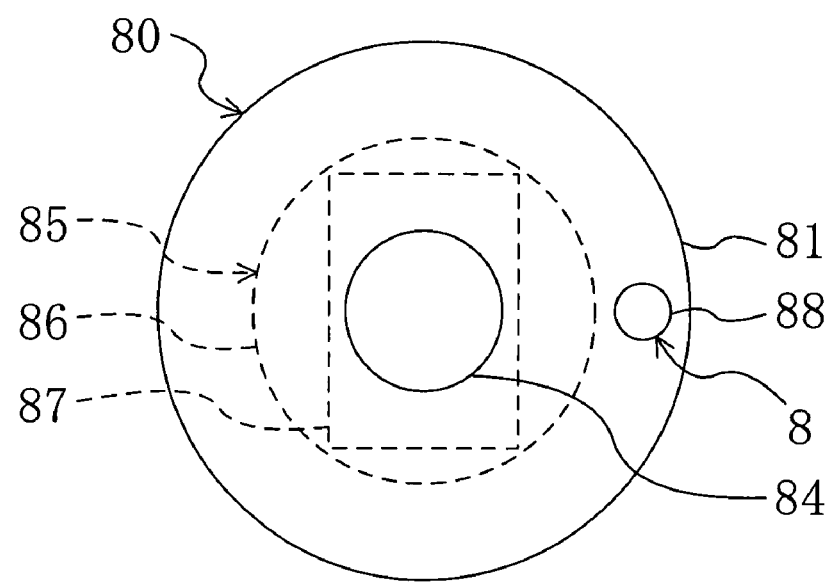
Figure 6A:
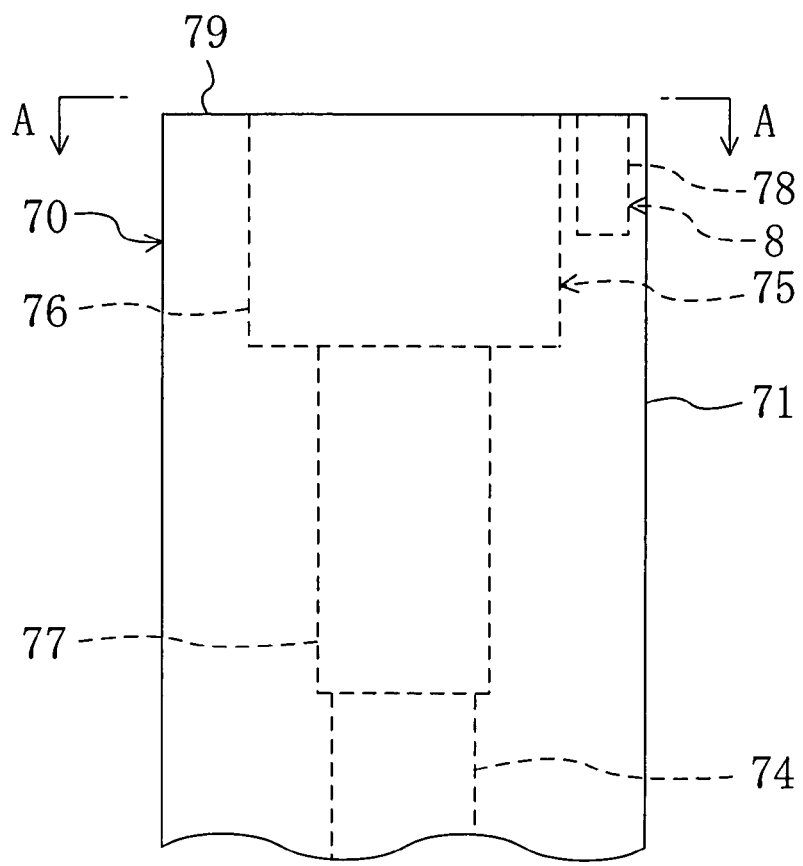
FIG. 6(a) is a top plan view and FIG. 6(b) is a cross sectional view taken along the line A-A of FIG. 6(a)
Figure 6B:
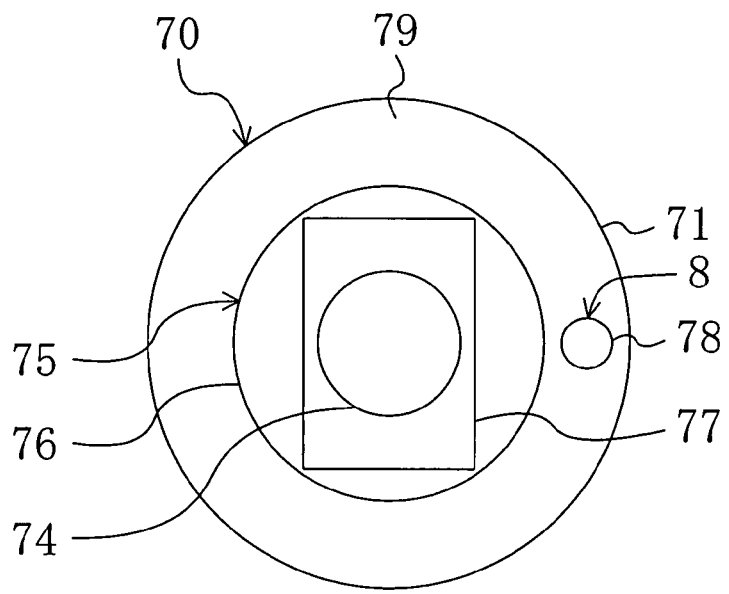

In the following, description will be made in regard to a second embodiment of the present invention by making reference to FIGS. 5 and 6.

The second embodiment is a modification of the first embodiment (more specifically, in the second embodiment, the engagement convex and concave portions (85, 75) of the first embodiment are modified in their shape). In other words, the power transmitting convex and concave portions (87, 77) of the first embodiment are shaped like a regular polygon when viewed in cross section while on the other hand the power transmitting convex and concave portions (87, 77) of the second embodiment are shaped like a rectangle which is a polygon when viewed in cross section. Also in this arrangement, it is ensured that rotational power is transmitted to the compression rotating shaft (70) without the occurrence of idling of the expansion rotating shaft (80). In addition, its cross section has a simple shape, thereby facilitating the step of processing and reducing the cost of manufacturing. Other configurations, operation, and working effects in the present embodiment are the same as the first embodiment.

Third Embodiment of the Invention

Figure 7A:
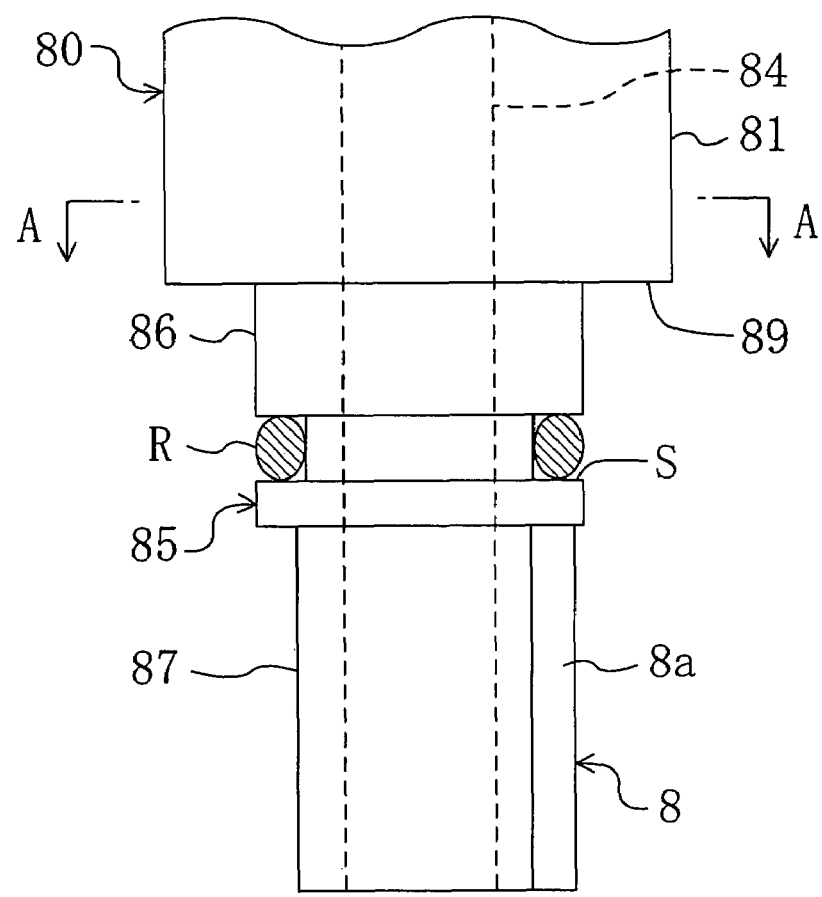
FIG. 7(a) is a top plan view and FIG. 7(b) is a cross sectional view taken along the line A-A of FIG. 7(a)
Figure 7B:
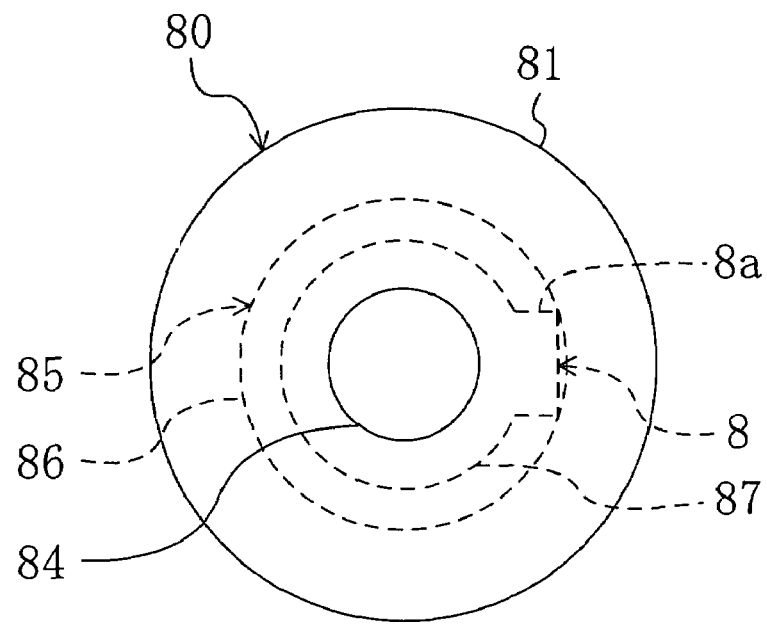
Figure 8A:
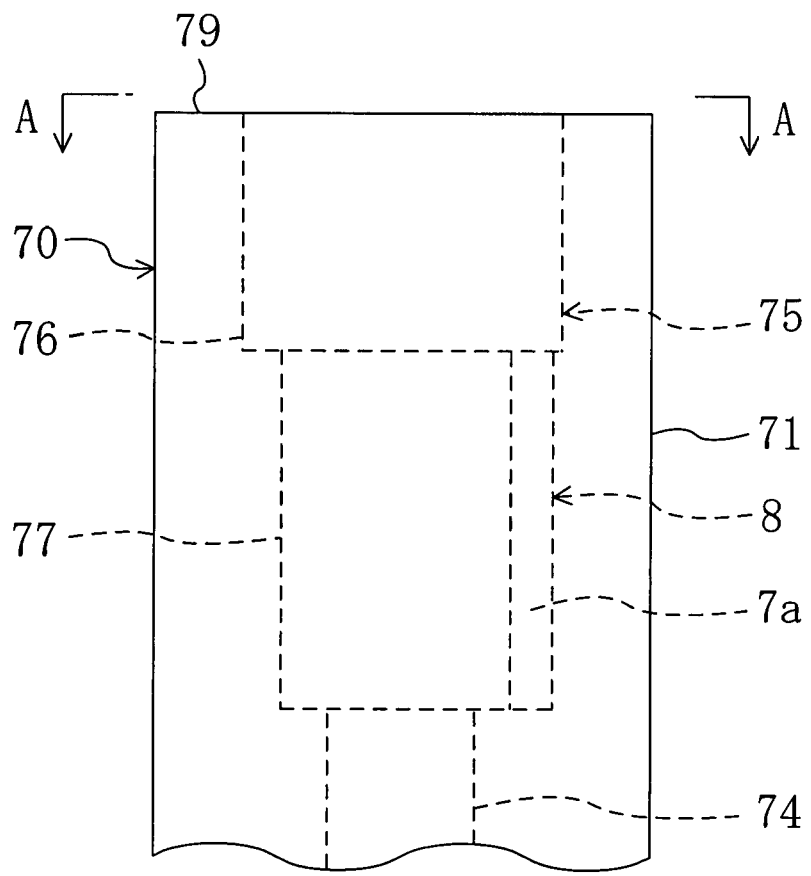
FIG. 8(a) is a top plan view and FIG. 8(b) is a cross sectional view taken along the line A-A of FIG. 8(a)
Figure 8B:
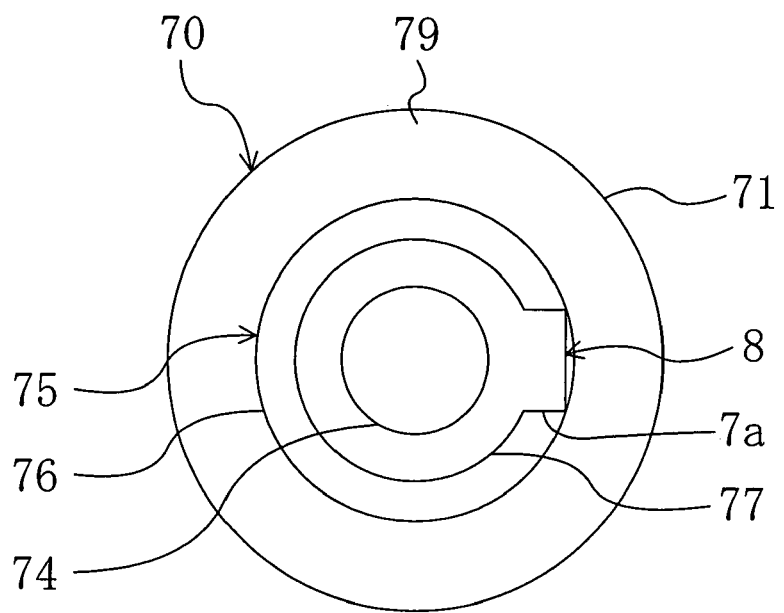

In the following, description will be made in regard to a third embodiment of the present invention by making reference to FIGS. 7 and 8.

The third embodiment is a modification of the first embodiment (more specifically, in the third embodiment, the power transmitting convex and concave portions (87, 77) of the first embodiment are modified in their shape and, in addition, the locating means (8) of the first embodiment is modified). In other words, the power transmitting convex portion (87) is formed such that it has a partly-projecting circular cross section (more specifically, the power transmitting convex portion (87) is provided with a projected rectangular key portion (8a). Stated another way, in the power transmitting convex portion (87), the key portion (8a) is formed in the outer peripheral surface of the circular cylinder axially extending over the length direction. On the other hand, in the power transmitting concave portion (77), a key groove (7a) shaped like a rectangle corresponding to the key portion (8a) is formed in the circular inner peripheral surface over the length direction. By engagement of the key portion (8a) and the key groove (7a), it is ensured that rotational power is transmitted to the compression rotating shaft (70) without the occurrence of idling of the expansion rotating shaft (80). To sum up, the key portion (8a) and the key groove (7a) constitute a so-called rotation preventing means for preventing idling of the expansion rotating shaft (80).

Furthermore, the key portion (8a) and the key groove (7a) also constitute a locating means (8) as a substitute for the locating pin (88) and the pin hole (78). In other words, the formation position of the key portion (8a) and key groove (7a) is determined such that the rotating shafts (70, 80) are coupled together in a predetermined phase relation which permits correspondence between the phase of the compression rotating shaft (70) in which the compression torque reaches its peak value and the phase of the expansion rotating shaft (80) in which the expansion torque reaches its peak value, as in the first embodiment. In this way, in the present embodiment, the power transmitting convex and concave portions (87, 77) serve also as the locating means (8), thereby eliminating the need for separately processing and forming the locating means (8) and therefore making it possible to shorten the processing step of the rotating shafts (70, 80). In the present embodiment, the key portion (8a) and the key groove (7a) are formed such that they have a cross section shaped like a rectangle; however, they may have a cross section shaped like, for example, a semicircle. Other configurations, operation, and working effects in the present embodiment are the same as the first embodiment.

Fourth Embodiment of the Invention

Figure 9A:
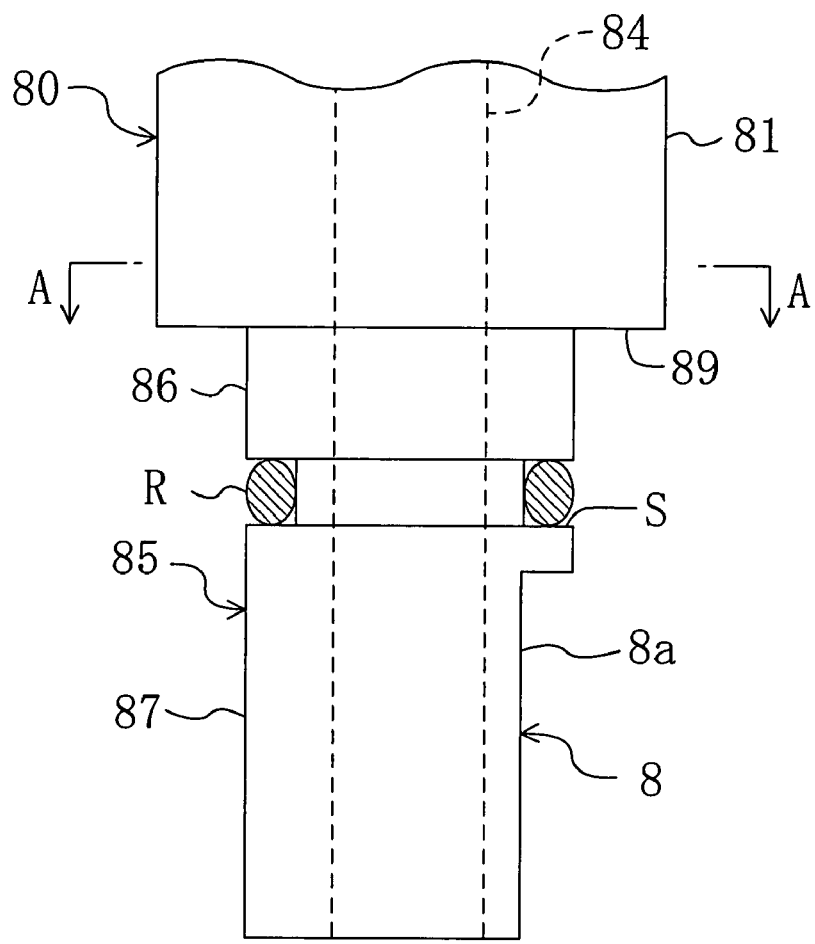
FIG. 9(a) is a top plan view and FIG. 9(b) is a cross sectional view taken along the line A-A of FIG. 9(a)
Figure 9B:
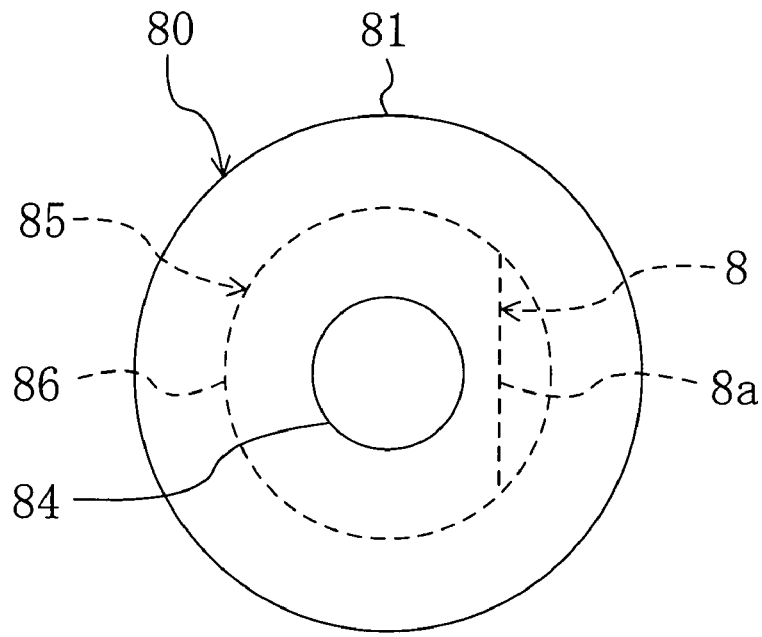
Figure 10A:
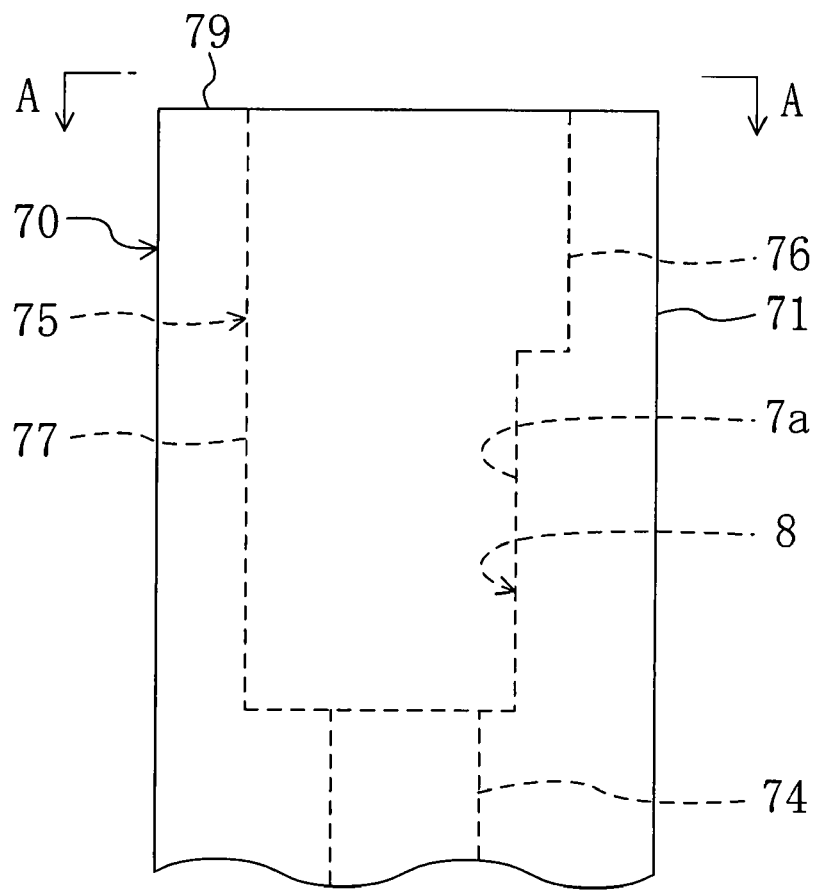
FIG. 10(a) is a top plan view and FIG. 10(b) is a cross sectional view taken along the line A-A of FIG. 10(a).
Figure 10B:
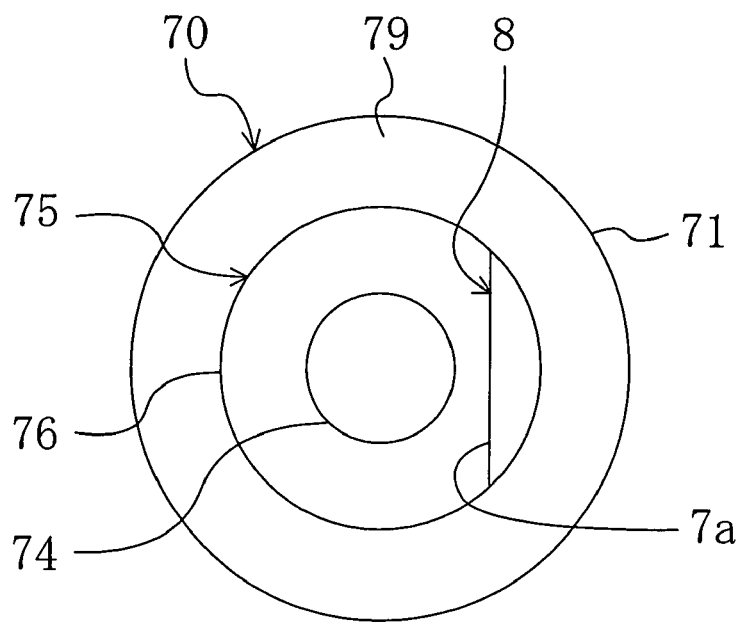

In the following, description will be made in regard to a fourth embodiment of the present invention by making reference to FIGS. 9 and 10.

The fourth embodiment is a modification of the third embodiment (more specifically, in the fourth embodiment, the key portion (8a) of the power transmitting convex portion (87) and the key groove (7a) of the power transmitting concave portion (77) are modified in their arrangement). Stated another way, in the fourth embodiment, a key groove (8a) is formed on the side of the power transmitting convex portion (87) while a key portion (7a) is formed on the side of the power transmitting concave portion (77).

More specifically, the power transmitting convex portion (87) is provided, in its circular outer peripheral surface having the same diameter as that of the base portion (86), with the key groove (8a) shaped like a semi-crescent. In other words, the power transmitting convex portion (87) has a cross sectional shape composed of a circular arc and a single liner portion. The key groove (8a) is formed over the length direction. On the other hand, in the power transmitting concave portion (77), the semi-crescentic key portion (7a) corresponding to the key groove (8a) is projectingly formed in the circular inner peripheral surface over the length direction. And, also in the present embodiment, the key groove (8a) and the key portion (7a) constitute not only a rotation preventing means for preventing idling of the expansion rotating shaft (80) but also a locating means (8) for coupling together the rotating shafts (70, 80) in a predetermined phase relation, as in the third embodiment. This therefore makes it possible to shorten the processing step of the rotating shafts (70, 80). In the present embodiment, the key groove (8a) and the key portion (7a) are formed such that they have a cross section shaped like a semi-crescent; however, they may have a cross section shaped like a rectangle. Other configurations, operation, and working effects in the present embodiment are the same as the first embodiment.

Other Embodiments

In regard to each of the foregoing embodiments, the present invention may be arranged as follows.

For example, in each of the foregoing embodiments, it may be arranged such that the engagement convex portion (85) is formed on the side of the compression rotating shaft (70) and the engagement concave portion (75) is formed on the side of the expansion rotating shaft (80).

In addition, the O-ring (R) is employed as a seal member for the seal mechanism (S, R) in each of the foregoing embodiments, which should however not be deemed as restrictive of the present invention. Alternatively, a V-packing or the like may be used.

Additionally, the compression mechanism (50) and the expansion mechanism (60) are implemented by rotary mechanisms; however, the present invention is applicable to the case where the compression mechanism (50) and the expansion mechanism (60) are implemented by scroll mechanisms. In addition, it is needless to say that the compression mechanism (50) may be of a single cylinder type and the expansion mechanism (60) may be of a two-stage expansion type.

INDUSTRIAL APPLICABILITY

As has been described above, the present invention finds utility as a fluid machine having an expander for generating power by the expansion of fluid and a compressor which are mechanically coupled together.

What is claimed is:

1. A fluid machine comprising:
   a casing (31), the casing (31) containing therein (i) a compression mechanism (50) for compressing fluid and (ii) an expansion mechanism (60) for generating rotational power by the expansion of fluid, wherein:
   (a) a rotating shaft (70) of the compression mechanism (50) and a rotating shaft (80) of the expansion mechanism (60) are coupled together;
   (b) oil supply grooves (74, 84) in fluid communication with each other are formed respectively in the rotating shafts (70, 80); and
   (c) a seal mechanism (S, R) for providing sealing between coupling portions of the rotating shafts (70, 80) is provided;
   (d) the rotating shaft (80) has a shaft end with a convex portion (85) and the rotating shaft (70) has a shaft end with a concave portion (75) into which the convex portion (85) is engaged; and
   (e) the seal mechanism (S, R) comprises (i) a seal groove (S) formed in a peripheral surface over the circumferential direction of either one of the convex portion (85) and the concave portion (75) and (ii) a seal member (R) engaged into the seal groove (S),
   wherein the fluid machine is provided with locating means (8) by which the rotating shafts (70, 80) are coupled together in a predetermined phase relation which permits correspondence between the compression stroke of the compression mechanism (50) and the expansion stroke of the expansion mechanism (60).

2. The fluid machine of claim 1, wherein:
   (a) the convex portion (85) is provided with a power transmitting convex portion (87) for transmitting rotational power, the power transmitting convex portion (87) having a polygonal shape when viewed in cross section and the concave portion (75) is provided with a power transmitting concave portion (77) into which the power transmitting convex portion (87) is engaged; and
   (b) the locating means (8) comprises (i) a rod-shaped locating pin (88) which is mounted eccentrically from the center of one of the rotating shafts (70, 80) in its shaft end surface and (ii) a pin hole (78) which is formed in the other of the rotating shafts (70, 80) and into which the locating pin (88) is engaged.

3. The fluid machine of claim 1, wherein the locating means (8) comprises (i) a key portion (8*a*) formed in a peripheral surface of one of the convex portion (85) and the concave portion (75) and (ii) a key groove (7*a*) formed in a peripheral surface of the other of the convex portion (85) and the concave portion (75).

4. The fluid machine of claim 2 or claim 3, wherein an electric motor (40) for activating the compression mechanism (50) is connected to the compression mechanism (50) by the rotating shaft (70) of the compression mechanism (50).

5. The fluid machine of claim 4, wherein the power transmitting convex portion (87) of the convex portion (85) and the power transmitting concave portion (77) of the concave portion (75) are surface-hardened.

6. The fluid machine of claim 4, wherein the fluid machine is used in a refrigerant circuit (20) in which refrigerant is circulated whereby a vapor compression refrigeration cycle is performed.

7. The fluid machine of claim 6, wherein the refrigerant is carbon dioxide.

* * * * *